Sept. 22, 1959     A. A. LAWSON ET AL     2,904,785
STAPLING MACHINE

Filed March 1, 1954     6 Sheets-Sheet 1

INVENTORS
Axel Arnold Lawson
Herbert K. Hazel
Howland R. Gary
Max Gittles
BY

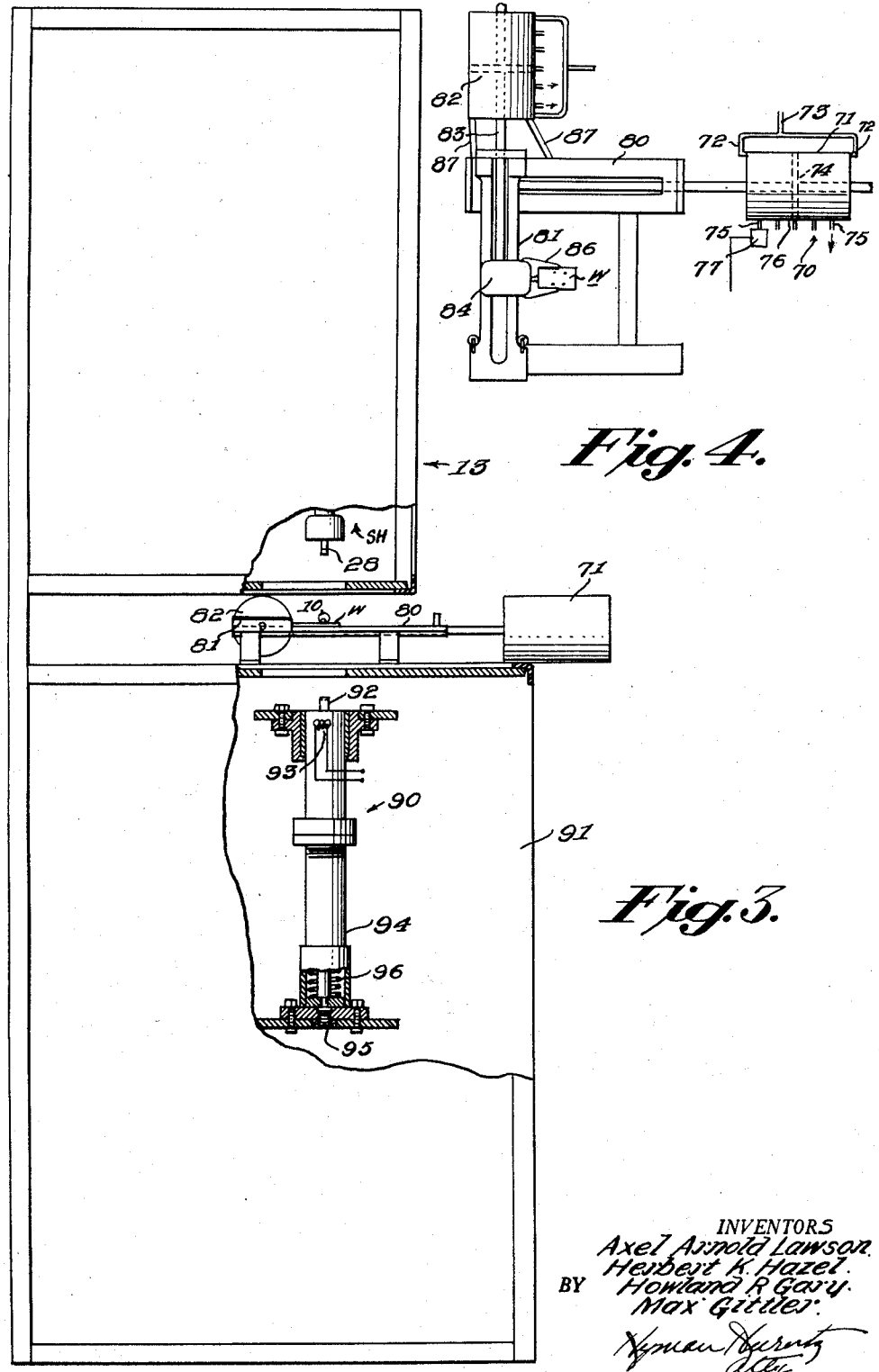

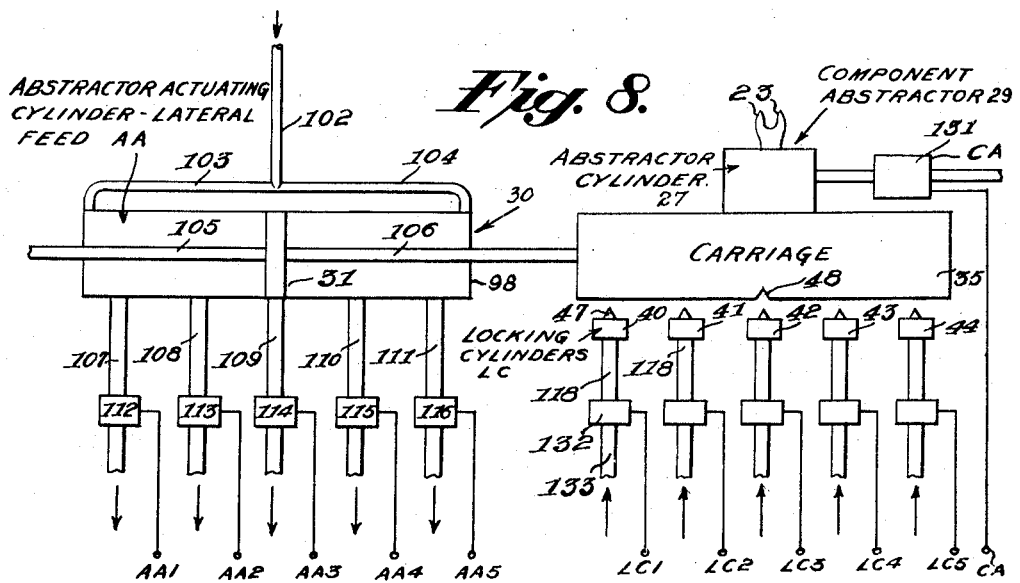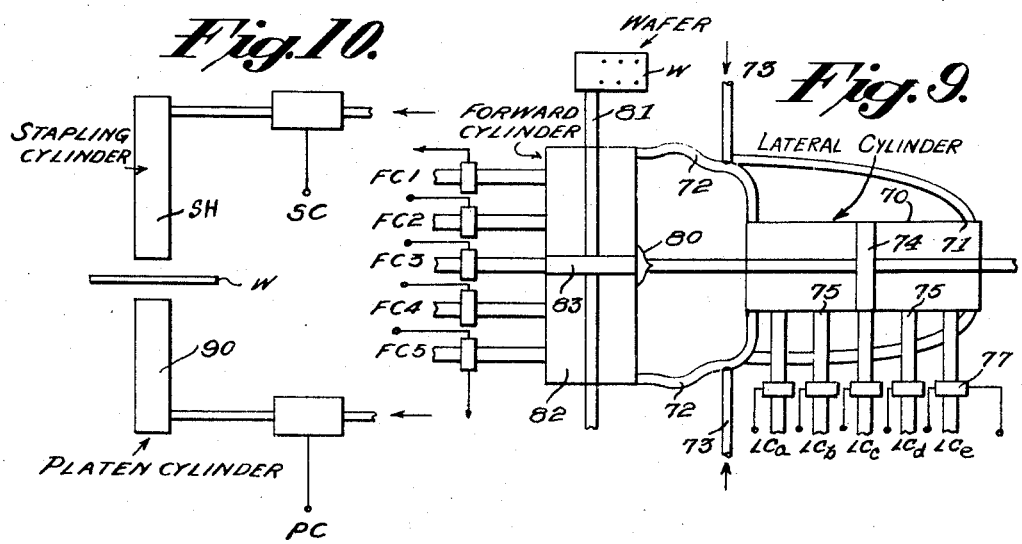

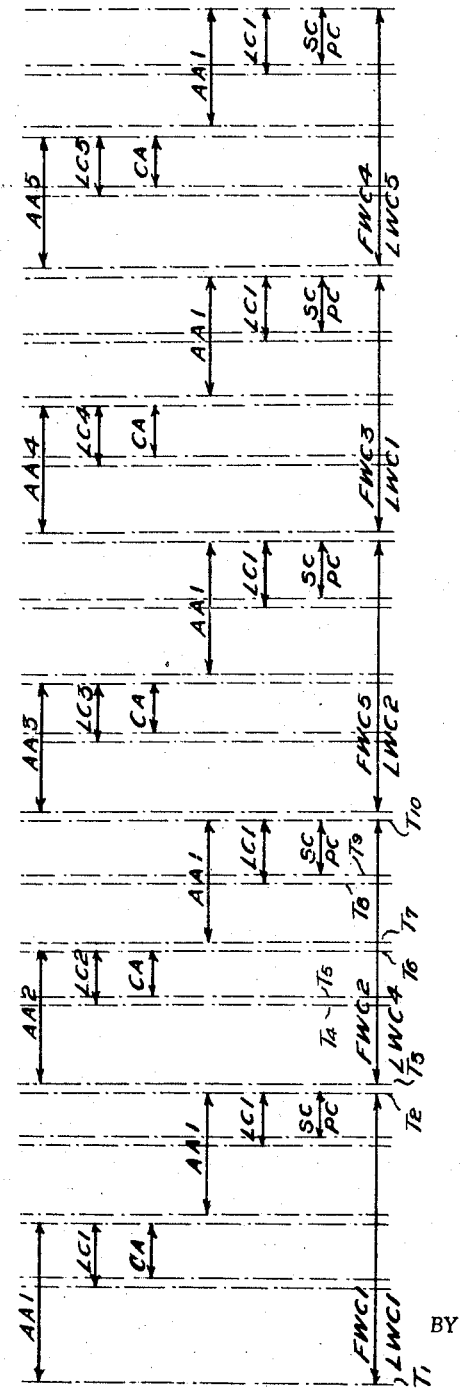

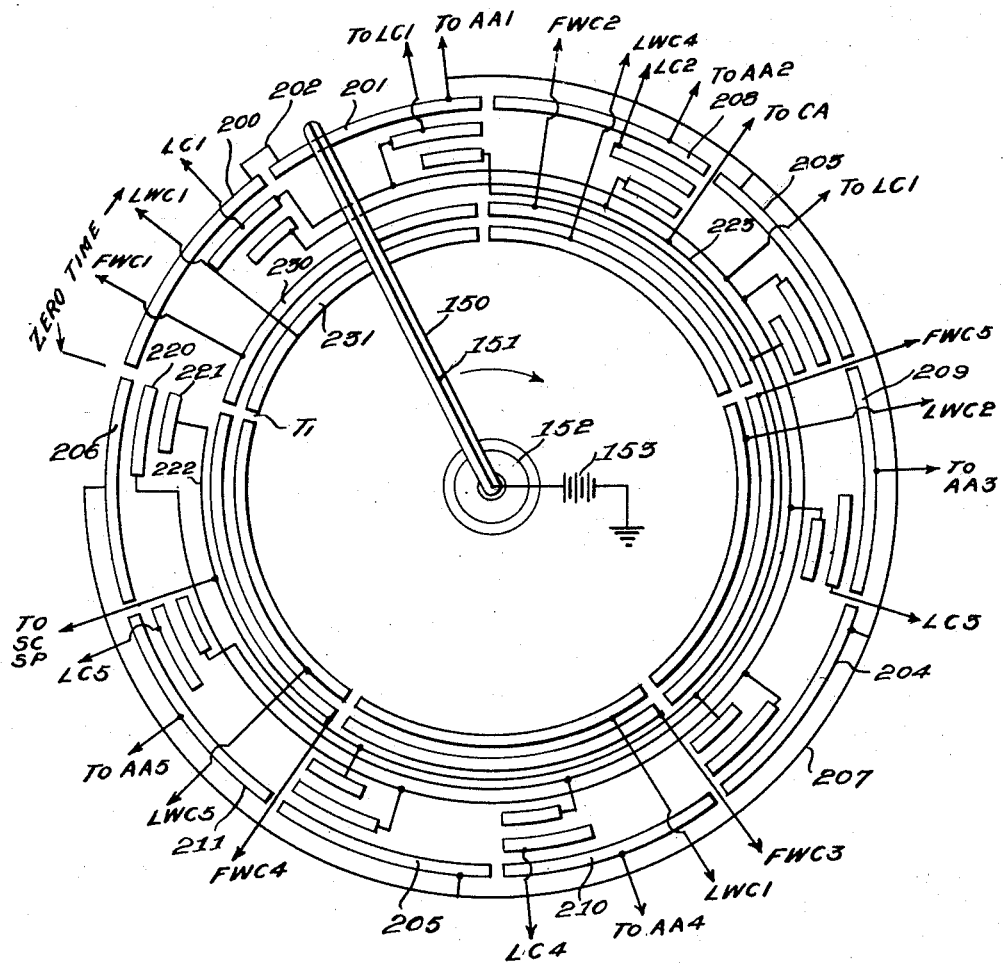

United States Patent Office 2,904,785
Patented Sept. 22, 1959

2,904,785

STAPLING MACHINE

Axel Arnold Lawson and Herbert K. Hazel, Arlington, and Howland R. Gary and Max Gittler, Alexandria, Va., assignors to Melpar, Inc., Alexandria, Va., a corporation of New York Application March 1, 1954, Serial No. 413,092

12 Claims. (Cl. 1—2)

The present application is related to a concurrently filed application, now abandoned, entitled, Modular Circuitry Serial #413,072, filed in the name of Lawson et al., and assigned to the assignee of the present application.

The present application relates to an automatic machine for fabricating electrical sub-assemblies, and more particularly to an automatic machine for securing a plurality of electrical components, such as resistors or the like, to predetermined positions of a thin pre-perforated wafer.

Briefly describing the invention, a wafer, in the form of a thin sheet of insulating material, is provided with a plurality of aperture pairs, for insertion of the terminal leads of electrical components therein. The wafer is provided with printed circuitry on one of its sides, and the components are secured to the other side, the terminal leads of the components passing through the apertures and being bent into stapled relation to the wafer and into contact with the printed circuitry. The circuitry may be pre-tinned, and during the process of bending over the ends of the leads they may be heated to form a soldered joint with the circuitry.

The wafer sub-assembly above briefly described is further described, and illustrated in detail, in our copending application, above referred to.

In order to fabricate the wafer sub-assemblies automatically, a number of laterally spaced conveyor chutes is provided. Each conveyor chute contains components of identical kind, and the separate chutes, laterally displaced from one another, contain different components. A difference in components may involve a difference in type for example, as between condenser and resistance, or a difference in size, or power or voltage rating. The chutes are stationary, and means are provided for selecting the chutes which deliver components to a component inserting device in sequence, and automatically.

The moving components of the machine are operated by pneumatic servos, electrically controlled. A first servo shifts a component abstracting device laterally to a proper component delivery chute, and the abstracting device then abstracts a single component from the chute. This component is then delivered to a stapling and soldering head, where is located a pre-apertured wafer. The wafer is positioned in two coordinate directions by a pair of servos acting at right angles, so that the proper pair of component receiving apertures will be positioned under the stapling and soldering head. The latter then acts to bend the ends of the component leads to a direction at right angles to their original directions, to insert the ends into the component apertures in the wafer, and to bend the ends under, i.e. performs a stapling operation on the component leads. The anvil of the stapling and soldering head is heated, and solders the lead ends to printed circuitry located on the under sides of the wafer, and running between pairs of apertures in accordance with a desired circuit arrangement.

Thereafter, the first servo shifts the component abstracting device again into registry with a further chute, to select a further and different component, returning that component to the stapling and soldering head, which secures the component to the wafer (the latter having previously been positioned to a suitable position for that component). The consecutive component selecting, and stapling and soldering steps, proceed automatically until a wafer is completed, when the wafer is removed by hand, a new wafer inserted, and a further cycle of operations initiated.

It is, accordingly, a broad object of the present invention to provide a novel machine for automatically assembling an electrical component on a wafer.

It is a further object of the invention to provide a novel machine for automatically assembling a plurality of different electrical components each at a pre-selected position of a single wafer.

Another object of the invention resides in the provision of a system for simultaneously stapling an electrical component to a wafer, utilizing the terminal leads of the component as stapling elements, to enable soldering of the terminal leads to wiring on the wafer.

The above and still further features, objects and advantages of the present invention will become apparent upon consideration of the following detailed disclosure of a specific embodiment thereof, especially, when taken in conjunction with the accompanying drawings, wherein:

Figure 3 is a view in side elevation of a machine, in accordance with the invention;

Figure 4 is a view in plan of a wafer positioning unit;

Figure 5 is a view in perspective of a component stapling unit, and associated anvil;

Figure 6 is a view taken in the direction of the arrow 6, in Figure 1;

Figure 7 is an enlarged view of the lower end of a component delivery chute, taken in vertical section;

Figure 8 is a diagrammatic view of a pneumatic component abstractor positioning unit, and of the component abstractor;

Figure 9 is a diagrammatic view of a pneumatic wafer positioning device;

Figure 10 is a diagrammatic view of a pneumatic stapler and anvil actuator;

Figure 11 is a timing diagram for the machine of the invention, with accompanying interpretive legend; and Figure 12 is a diagrammatic view of a sequence control switch for the system of the invention.

Figure 1:
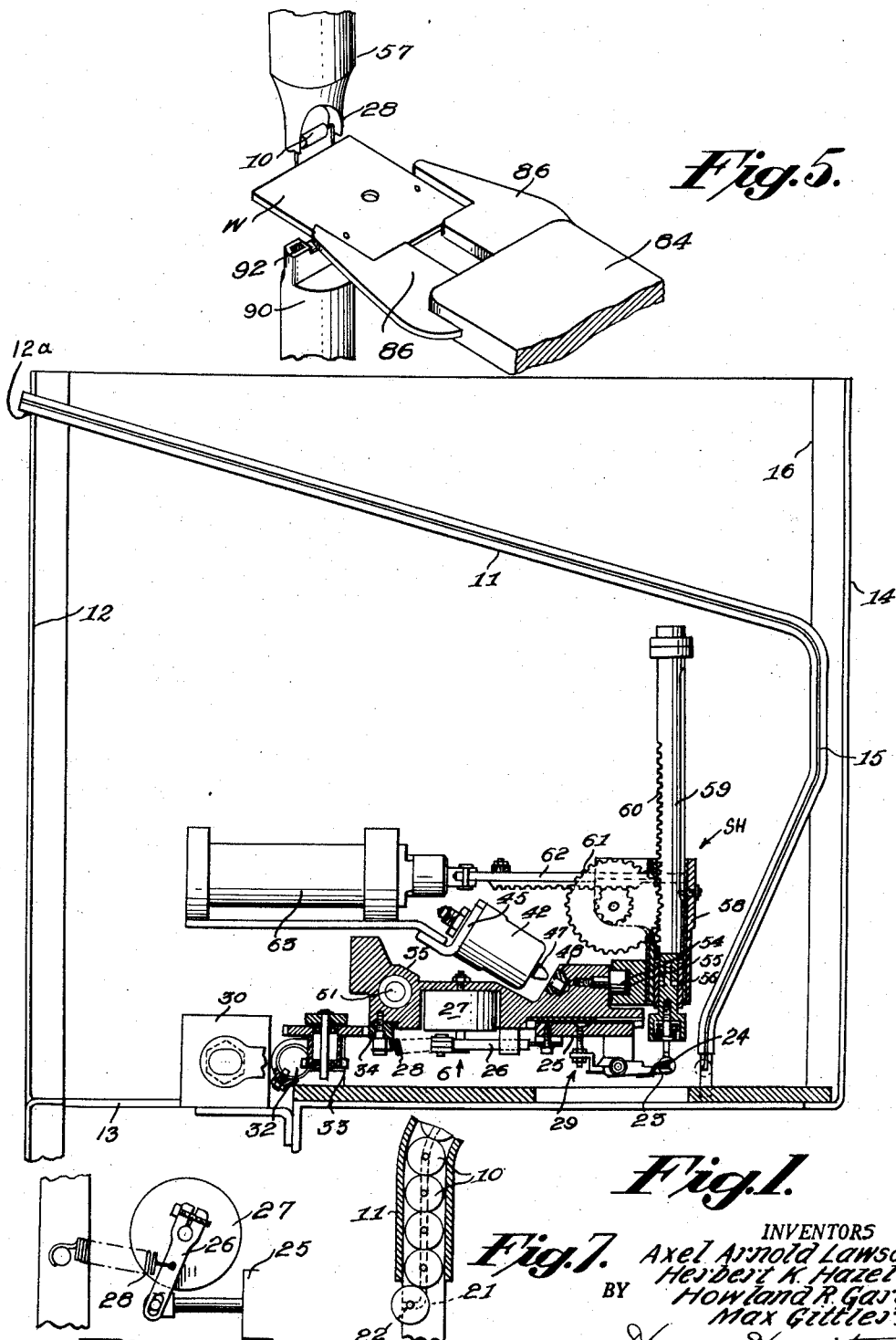
Figure 1 is a sectional view in side elevation of mechanism for selecting and abstracting electrical components from component delivery chutes, and of an associated stapling head.
Figure 2:
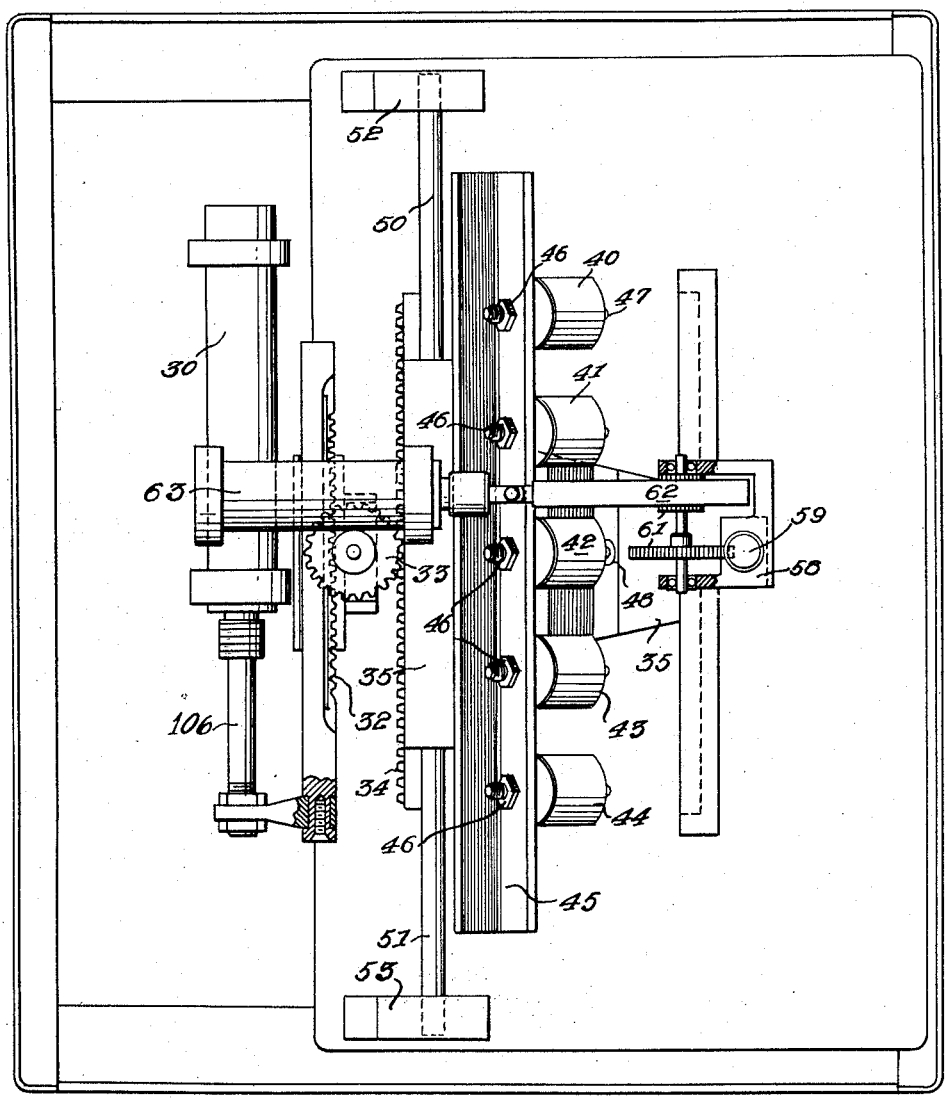
Figure 2 is a view in plan, corresponding generally to Figure 1.

Referring now more particularly to the accompanying drawings, and particularly to Figure 1 thereof, the electrical components 10, such as resistors, which are to be assembled to a wafer W are loaded into laterally separated chutes 11, the different chutes containing components of different kind. The chutes 11 are inclined downwardly from the rear wall 12 of a housing 13, to a position adjacent the forward wall 14, and the components 10 are loaded into the chutes 11 via apertures 12a in the rear wall 13, descending by gravity toward the forward wall 14.

The components 10 are assumed, solely for the purposes of the present exposition, to have a body of cylindrical shape and to possess two oppositely extending leads co-axial with the cylinder. The components 10 fall to the point 21, at which point an egress 22 is provided in the vertical chute 15 in the form of a horizontal slot 22.

A pair of fingers 23, having superposed resilient members 24, is secured to a carriage 25, which may be actuated forwardly in response to a motion of a crank 26, driven by a pneumatic motor 27. The crank 26 is biased by spring 28 to its normal position, in which fingers 23 are withdrawn to a position such that a stapling head SH overlies the component 10.

In order that any desired type of component may be selected, from any pre-selected one of the chutes, 11, the component abstractor 29, comprising collectively the carriage 25 and the elements carried thereby which perform the function of abstracting components from the several chutes 11, must be laterally positioned opposite the pre-selected chute, must thereafter abstract a component, and must then return to the stapling position.

To this end is provided a pneumatic servo-motor 30 having a piston 31, which may be actuated, in a manner hereinafter disclosed, to any desired one of five positions, the number being arbitrary, and thereafter to any other one of the five positions. These positions are each opposite a different chute 11. The piston 31 actuates a rack 32, which causes rotation of a pinion 33, and the rotation of pinion 33 causes translation of a further rack 34. The rack 34 is secured to a main carriage 35, and actuates the latter in translatory motion. To the main carriage 35 is secured the subsidiary carriage 25 which carries the component abstractor 29, and its pneumatic servo motor 27.

When the main carriage 35 has been actuated to a preselected lateral position by the pneumatic servo motor 30, it is locked in that position by energizing a selected one of a plurality of laterally displaced pneumatic servos 40, 41, 42, 43, 44, all fixedly mounted on a stationary laterally extending bar 45 by means of suitable bolts 46. Each of servos 40—44 is spring biased to inoperative position, and has a tapered plunger 47. The latter seats in a tapered opening 48 carried by the main carriage 35 when the servo is supplied with air under pressure, and is retracted by the spring when air pressure is removed. This locking action serves accurately to position the main carriage 35 at each of its possible positions, as well as to lock the main carriage firmly in any one of its possible positions during a component abstracting operation.

The laterally extending bar 45 being stationary, and the carriage 35 being laterally positionable, the latter is secured to oppositely extending bars 50, 51, which translate through bearings 52, 53, respectively, fixed with respect to the bar 45.

Secured to the forward part of the main carriage 35 is a roller 54 having its axis extending forwardly. The roller 54 rides in a lateral slot 55 in a stationary bar 56, to which is secured and from which is supported, a stapling head generally denominated 57. The roller 54 and slot 55 serve to maintain the relative vertical positions of the main carriage 35 and the stapling head 57, during lateral translation of the main carriage 35. The stapling head 57 includes a vertical bearing member 58, and a piston 59 which may be guided by the bearing member 58 during vertical strokes, downward and return. The piston 59 includes a rack 60, actuatable by a pinion 61, and the latter in turn is driven by a servo driven rack 62. The driving servo 63 is of the pneumatic type, being spring biased to its normal position, and actuated when air under pressure is supplied thereto. When actuated, piston 59 is stroked vertically downward, causing stapling head SH to staple a component 10 to a wafer. When air pressure is removed the piston 59 returns to its original position in response to the bias spring.

The anvil for the stapling assembly is positioned under the wafer and while it might be arranged to be stationary, as is conventional to staplers, we prefer to arrange the anvil to be actuated vertically upward into stapling position by a pneumatic servo.

The water is pre-punched at positions selected, not at random, but restricted to discrete values in each of two coordinate positions.

We have assumed five possible positions laterally, and five longitudinally of the wafer, solely to simplify the exposition. The wafer is positioned by a pair of pneumatic servos, acting at right angles to the other, each servo having five distinct positions. If we assume that each possible combination of servo positions represents a possible component position, i.e. positions a pair of wafer apertures under the stapling assembly, this implies that each wafer may carry twenty-five components. In fact, so many will seldom be required, and the timing and control arrangement hereinafter prescribed allows for a total of only five. The timing and control arrangements are, however, exemplary only, and more or fewer components may be provided for in any specific design of a machine according to the invention.

Considering the positionable servo 70, Figures 4 and 9 as typical, a cylinder 71 is provided which is supplied at both ends via conduits 72, with air under pressure, derived from a common source 73. A central piston 74 is provided in the cylinder 71, and a number of air outlet ports 75 are provided in the cylindrical wall 76 of the servo 70. Each port 75 may be opened, independently of the others, by a solenoid controlled valve 77, and when any port is opened an unbalance of forces is created at the opposite walls of the piston 74, driving the piston to a position covering the opened port and preventing egress of air. When the latter has occurred the forces are again balanced and the piston remains stationary.

The servo 70 actuates a carriage 80 laterally. The carriage 80 carries a further carriage 81, positionable by servo 82, and the piston 83 of the servo 82 drives a wafer clamp 84, which supports and firmly holds a wafer W, between jaws 86.

The servo 82 may be secured to the carriage 80 by suitable brackets, as 87, and since the servo 82 need only move a relatively short distance, the pneumatic conduits leading to and from the servo 82 may conveniently be flexible hose.

It follows that by selecting one of the ports of servo 82, and one of the ports of servo 71, as by energizing selected solenoids, the wafer W may be positioned to any one of its possible twenty-five positions, by two motions in coordinate directions, and there retained until a suitable component has been inserted.

If desired, means may be provided, of conventional character per se, for locking the positionable servos in any of their pre-selected positions, when the latter have been attained.

The anvil assembly 90, which cooperates with the stapling assembly to effect a stapling operation may be housed in a base housing 91, underlying the main housing 13, and spaced vertically therefrom. The anvil 92, itself, may be made of hardened copper, so that it may efficiently solder, and may be heated by an electrical heating coil 93, supplied with electric current in any conventional manner. The anvil 92 may be pneumatically operated by a pneumatic servo 94, supplied with air under pressure via an opening 95, and biassed by helical spring 96 to its lower, or withdrawn, position. The wafer W is introduced between the housings 13 and 91, and there positioned accurately by servos 71 and 82. Thereafter, the stapling head 57 is driven downwardly by its servo 63, and the anvil is driven upwardly by its servo 94, both actions occurring simultaneously, and the abstracted component 10 thereby stapled to the wafer W, and soldered to its printed circuitry.

Referring now to Figure 8 of the accompanying drawings, there is illustrated the servo mechanism AA (abstractor actuator), which positions the component abstractor head of the machine. This device includes the pneumatic servo 30, including a cylinder 98 having considerable elongation, and having internally thereof the piston 31, which rides smoothly and fits snugly in the internal walls of the cylinder 30. Air under pressure is fed to both ends of the cylinder from a suitable source (not shown) via a conduit 102, which branches to the ends of the cylinder of servo-motor 30 by further conduits 103, 104. The piston 31 is provided with two piston rods 105, 106, which extend in opposite directions, and which pass through the end walls of the cylinder of servo-motor 30. Accordingly, so long as air pressure is maintained in the conduit 102, and so long as the cylinder of servo-motor 30 is closed, precisely equal and opposite forces are applied to opposite walls of the piston 31, and the piston remains stationary.

In one cylindrical wall of the cylinder of servo-motor 30 is provided a plurality of outlet conduits, which are five in number for the sake of example only, and which are shown as identically spaced along the wall, for example only. Exhaust conduits are identifiable by the reference numerals 107, 108, 109, 110 and 111 and are controlled by solenoid actuated valves 112, 113, 114, 115 and 116, respectively. The solenoid actuated valves in turn are energized in response to voltage applied to leads AA1 to AA5, inclusive, respectively, and this energization is controlled by means of a time controlled switch, hereinafter described in detail. So long as the solenoids of the solenoid actuated valves 112 to 116, inclusive, remain unenergized, the exhaust conduits 107—111 remain closed, and the piston 31 remains subjected to equal and opposite forces, and therefore stationary. When any one of the solenoid actuated valves 112—116 is opened, the corresponding exhaust conduit of conduits 107—111, inclusive, is opened, and at that time if the opened exhaust conduit is not closed by the piston 31, air exhausts from one side of the cylinder of servo-motor 30, but not from the other, which results in unbalance of forces on the piston 31, and the piston 31 accordingly moves. Its movement stops when it has attained a position which overlies the open exhaust conduit, at which time equality of forces on the walls of the piston 31 is again attained. Accordingly, by the simple expedient of energizing selected ones of the leads AA1 to AA5 inclusive, the piston 31 may be caused to move to corresponding lateral positions.

Since the servo AA is a pneumatic servo the position of the piston 31 is not rigid. In order to lock the piston 31 in any one of its actuated positions, there is provided on the carriage 35 a tapered notch 48. The carriage 35 is movable in response to movement of the piston 31, since it is secured to the piston rod 106. Secured to the carriage is a component abstracting head 29 which moves forwardly when air is supplied to the pneumatic motor 27, and which returns to normal position when air pressure is removed, under the influence of spring 28. Application of air pressure, and removal thereof, is controlled by a solenoid actuated valve 131, which is in turn controlled from the lead CA₁. The carriage is locked in position by actuating a selected one of a plurality of two position servos identified generically by the reference numeral LC (for locking cylinder) and each servo being controlled by a solenoid actuated valve 132, inserted in its supply conduit 133. The solenoid controlled valves are energized in response to voltage supplied by a time controlled switch to the several leads labeled LC1, LC2, LC3, LC4, LC5.

Turning now to Figure 11 of the accompanying drawings, there is illustrated a timing diagram for the operation of the machine embodying the present invention. Starting at the extreme left of the diagram, it will be seen that one of the forward wafer actuating cylinders FC1 and one of the lateral wafer actuating cylinders LC1 are simultaneously supplied with electrical impulse, so that the wafer W is positioned promptly in its first predetermined position, ready to receive an electrical component. The solenoid controls for the FC and the LC cylinders are maintained on during the entire operation of stapling the first component. At the same time that the control solenoids for the FC1 and LC1 cylinders are energized, the lead AA1 is energized, which selects the first exhaust port 107 of the abstractor actuating cylinder 30. The piston 31 of the abstractor actuating cylinder promptly moves into conjunction with the exhaust port 107, and having attained this position energy is supplied to the lead LC1, which actuates the locking cylinder 40. The carriage 35 is thereby locked in its No. 1 position. Shortly thereafter the lead CA is energized, which supplies current to component abstractor 29. The latter moves its carriage 25 forwardly to pick up a component 10 from the chute 11 before which the carriage 25 is positioned, and thereafter, and substantially simultaneously, the lead CA and the lead LC1 are de-energized, permitting the component abstractor to return to its withdrawn position, unlocking the carriage 35. In the first operation it has been assumed that the stapling position of the machine corresponds with the position of the carriage in its No. 1 position, i.e. when the lead AA1 is energized. Accordingly, it is not necessary that the carriage 35 be returned from a component abstracting position to a stapling position, but on the contrary these are the same positions. However, for the sake of symmetry, it has been provided that the machine carries out the same sequence of operations regardless of whether the carriage must or must not return to a stapling position from a component abstracting position. Accordingly, the next operation involves energization of the leads AA1, which again positions the carriage 35 in its No. 1 position. Thereafter, the lead LC1 is energized, which locks the carriage 35 in No. 1 position; and thereafter, the leads SC, PC are energized, which operates the stapling cylinder 63 and the anvil servo 94. Energization of these cylinders effects stapling of a component 10, wafer W, and also soldering of that component to the printed circuitry of the wafer W.

Following this operation, and specifically a time T2, the leads AA1, LC1, SC and PC are all de-energized, which leaves the carriage 35 in its last position, but unlocked, and which permits withdrawal of the stapling cylinder and platen cylinder to their unactuated positions. The duration of energization of the cylinders SC and PC is selected to be adequate to complete a soldering operation, and not so long as to burn the solder.

After a short time interval, and specifically at time T3, the lead AA2 is energized, which positions the carriage in its second or No. 2 position, i.e. with piston 31 of abstractor actuating cylinder 30 opposite the exhaust port 108. When the carriage 35 has had sufficient time to attain its position, and specifically at time T4, the lead LC2 is energized. Energization of the lead LC2 actuates the locking cylinder 41, and causes locking of the carriage 35 in its attained position. At time T5 the lead CA is energized, which causes the component abstracting cylinder to be supplied with air, and the carriage 25 then moves forwardly and picks up a component 10 from the No. 2 chute 11, before which it is then positioned.

At time T6 the lead CA is de-energized, which causes the carriage 25 to be withdrawn. Simultaneously the locking cylinder LC2 is de-energized, which unlocks the carriage 35, and at the same time the lead AA2 is de-energized, which leaves the piston 31 in its then position. After a short time gap, and specifically at time T7, the lead AA1 is energized, which causes the carriage 35 to return to its No. 1 position opposite the stapling head. Having attained that position, and specifically at a time T8, the lead LC1 is energized, which locks carriage 35 in its No. 1 position ready for a stapling operation. A short interval later, and specifically a time T9 the SC and PC leads are energized, which actuates the stapling cylinder and anvil servo, for a time adequate to insert a component 10 and solder that component to the wafer W.

Thereafter, specifically at a time T10, the leads AA1, LC1, SC and PC are all simultaneously de-energized, which unlocks the carriage 35, leaving it, however, in its then position, and which permits withdrawal of the stapling head and the platen head, due to removal of air pressure therefrom.

The timing herein described is repeated automatically, the carriage 35 being positioned in sequence to positions No. 1, 2, 3, 4, and 5, in each case the carriage 35 being locked, a component being abstracted, the carriage then being unlocked and returned to its stapling position, there locked, and the stapling and platen cylinders actuated for a time adequate to secure a component 10 to the wafer W. When the cycle of events has been completed, a new wafer W is inserted in the machine, preferably manually, and the cycle caused to repeat.

Referring now more specifically to Figure 12 of the accompanying drawings, there is shown a timing switch, which causes the sequential energization of the several solenoid controlled leads AA1—AA5 inclusive, LC1—LC5 inclusive, CA, SC, PC, SC1—SC5 and LC1—LC5, at the proper times in the operation of our invention.

More specifically, an arm 150 is provided having a relatively thin conductive bar 151 secured along the length thereof. The bar 150 is driven by a motor 152, the motor 152 being of a type which makes a single revolution and then must be re-energized. The motor 152 is shown as energized from a source 153, in the form of a battery, but it will be realized that any source may be employed employed including an alternating current source if the motor 152 is an alternating current motor. This same source may be employed to actuate the solenoids controlling the servo valves. The arm 150 is assumed to commence its revolution at the position T1, corresponding with time T1 on the timing diagram of Figure 11. There will be found in the commutator switch of Figure 12 an outer circle of conducting commutator elements, ten in number, which relate to control of the leads AA1—AA5. It will be noted that commutator segment 200 is connected to commutator segment 201 by lead 202, and thereafter, that alternate segments 203, 204, 205, 206, are interconnected by common lead 207. Contact of the segments 200, 201, 203, 204, 205, and 206 all result in energization of the AA1 lead, and consequently result in positioning of the carriage 35 at its stapling position. At intermediate times, i.e. when the conductor bar 151 contacts segments 208, 209, 210, and 211 the carriage 35 is driven respectively to positions No. 2, No. 3, No. 4, and No. 5, and there abstract suitable components. The next circle of commutator segments, proceeding inwardly, on the drawings, may be identified by the reference numeral 220. These commutator segments control the LC leads, i.e. LC1–LC5 inclusive and cause locking of the carriage 35 at appropriate times in the cycle of operation. The next succeeding circle of commutator segments taken inwardly of the diagram are the segments 221. These segments relate to the lead CA, which controls the component abstracting cylinder 25, and also to the leads SC, PC, which control the stapling cylinder 28 and the platen cylinder 90. To this end it will be noted that alternate ones of the commutator segments 221 are interconnected by a lead 222 leading to the SC and PC output leads, and the remaining commutator segments 221 are connected by a lead 223 connected to the CA lead.

The two innermost sets of commutator segments, 230 and 231, each cover one fifth of the total circumference of the switch of Figure 12, and for simplicity might have been combined into a single set of five commutator segments, since the stapling cylinder and the platen cylinder 90 are to be energized simultaneously and for the same length of time, and since both the wafer positioning cylinders, i.e. the forward cylinder 82 and the lateral cylinder 70 are simultaneously operated and remain operated for the same length of time. It is essential that these cylinders be operated so that the wafer W attains its final position prior to operation of the stapling cylinder and platen cylinder, but otherwise there is no urgency in respect to this operation. Since the wafer in no case must travel any considerable distance, being of the order of 1½ x 2 inches in size, appropriate control leads might well be energized just prior to actuation of the stapling cylinder and platen cylinder, 63 and 90. However, in order to prevent any tendency of the wafer W to wander between stapling operations, the segments 230, 231 have been extended so as to lock the wafer W into position substantially at all times.

While we have described and illustrated a preferred specific embodiment of our invention, as required by the statutes pertaining to Letters Patent of the United States, we realize that variations of organization and of constructional detail may be resorted to without departing from the true scope of the invention as defined in the appended claims.

What we claim is:

1. A machine for securing selected electrical components at selected positions of an insulated wafer, each component having two wire leads, each position being complementary to the component secured at that position, comprising a plurality of at least three component supply devices, each supplying a different component, means comprising an electrically controlled device for deriving only one of said components at a time from any one selected component supply device, and electrically controlled means for controlling stapling of each component by its own wire leads as stapling elements to said wafer at a position thereof which is complementary to the component being stapled.

2. A machine for inserting selected electrical components at selected positions of a wafer, said electrical components having wire leads, comprising a single stapling head, a plurality of component supply devices each delivering a different component, means including first electrical programming devices for deriving components from selected ones of said component supply devices in predetermined sequence and delivering the selected ones of said components to said stapling head, means comprising further electrical programming devices for relatively positioning said wafer and said stapling head at positions appropriate to the selected ones of said components and means operative only following completion of delivery of a component and of said relative positioning of said wafer and said stapling head for actuating said stapling head to form the wire leads of the selected ones of said components into said wafer.

3. The combination in accordance with claim 2, wherein said means for deriving and delivering said components includes electrically controlled mechanism responsive to the electrical impulses provided by said first electrical programming devices, wherein said means for relatively positioning said wafer and stapling head comprises a pair of motor controlled mechanisms arranged respectively to relatively move said wafer and stapling head in coordinate directions in response to impulses provided by said further electrical programming devices, and wherein is provided automatic control devices to control actuation of said mechanisms in timed sequence.

4. A machine for inserting selected electrical components at selected positions of a wafer which are appropriate to the components, said electrical components having wire leads, comprising a stapling head, a plurality of component supply devices each delivering a component of different character, means for deriving one of said components from any selected one of said component supply devices and delivering the selected one of said components to said stapling head, means for positioning said wafer with respect to said stapling head at a position appropriate to the selected one of said components, and means for actuating said stapling head to insert the wire leads of the selected one of said components as staple elements and to insert said staple elements into the wafer wherein said means for positioning said wafer comprises a pair of motor controlled mechanisms arranged respectively to move said wafer in coordinate directions, and wherein is provided automatic control devices to control actuation of said means for deriving said motor controlled mechanisms in timed sequence.

5. The combination in accordance with claim 4, wherein the machine is provided with supporting means for a wafer which is provided with pairs of apertures positioned to receive said staple elements and with pre-tinned printed circuitry intersecting said apertures.

6. A machine for inserting selected electrical components at selected positions of a wafer, said electrical components being of diverse kinds and having each a pair of collinear oppositely extending wire leads, a plurality of component supply devices, each supplying only one kind of said components, electrically responsive means for deriving a single one of said components from any selected one of said component supply devices at will, a stapling head, further electrically controlled means for relatively positioning said wafer and said stapling head and anvil in a position which is complementary to the last-selected component, control means operative only following selection of a component and relative positioning of said wafer of said stapling head and anvil in a relative position complementary to the selected component for activating said stapling head to form said wire leads of the selected one of said components as staple elements and to insert the staple elements so formed into said wafer, means responsive to said electrically controlled means for thereafter deriving another one of said components from a different selected one of said component supply devices, means responsive to said further electrically controlled means for further relatively positioning said wafer and said stapling head and anvil to a further position with respect to said stapling head which is complementary to the last-selected component, and means for thereafter actuating said control means.

7. In a machine for automatically fabricating electrical sub-assemblies, comprising electrical components and a wafer support therefor, the combination of at least three sources of electrical components, a wafer supporting element, a single device at a securing position for securing to said wafer any of said components delivered to said device, a device for selecting said components from said sources and delivering the selected components to said securing position in predetermined sequence, a device for moving said wafer and wafer supporting element in two coordinated directions at said securing position to a position selected to enable said wafer to receive the selected component at a point of said wafer which is complementary to the selected component, and means for sequentically controlling said devices to operate in a predetermined timed sequence.

8. In a machine for automatically fabricating an electrical sub-assembly, said sub-assembly comprising a wafer having perforations at predetermined positions thereof, said perforations being adapted to receive terminal leads of electrical components, said wafer having pre-tinned printed circuitry on at least one face thereof and passing in adjacent relation to said perforations, the combination of a reservoir of components of different characters, a securing station, a device for selecting in predetermined sequence components of said different characters from said reservoir and feeding said components to said securing station, a further device at said securing station for securing each of said components at a predetermined location on said wafer by forming the terminal leads of each of said components as staple elements and passing the staple elements so formed through selected ones of said perforations, and means for automatically controlling the operation of all said devices in a predetermined time sequence.

9. In a machine for automatically fabricating an electrical sub-assembly, said sub-assembly comprising a wafer of insulating material provided with perforation pairs at predetermined positions thereof, said wafer having printed circuitry on at least one face thereof and passing in adjacent relation to said perforations, a plurality of relatively fragile components having oppositely extending leads, said leads mechanically secured to said wafer and superposed over said printed circuitry and serving as staples for securing said components to said wafer, comprising the combination of reservoirs for supplying said components in a plurality of different sizes, a securing station, a device for selecting said components from said reservoirs and feeding the selected components to said securing station in predetermined sequence according to size, a device for securing each of the selected components at predetermined positions of said wafer by forming said leads as staple elements and inserting said staple elements through predetermined ones of said perforations, and means for automatically controlling the operation of said devices in a predetermined time sequence.

10. In a machine for automatically fabricating an electrical sub-assembly, said sub-assembly comprising a plane wafer of insulating material having a plurality of pairs of spaced perforations at predetermined positions thereof, said wafer having printed circuitry on at least one face thereof, said printed circuitry passing adjacent said perforations, and a plurality of electrical components of different characters each having a relatively fragile body and leads utilized as staple elements for stapling said body to said wafer, comprising a reservoir for said plurality of electrical components, a staple forming station, devices for delivering selected ones of said components one at a time to said staple forming station, devices at said station for bending the lead ends of each of said components delivered to said station at right angles to their normal directions and in a common plane and for passing the lead ends so bent through a selected pair of said apertures, means for selecting said apertures according to the characters of the components and means for automatically controlling the operation of said devices in a predetermined time sequence.

11. A machine for automatically securing selected electrical components at selected positions of an insulated wafer, each component having two oppositely extending wire leads and comprising a relatively fragile body secured to and between said leads, each of said selected positions being complementary to the components secured at that position, comprising a plurality of supply devices each for supplying components of a different character, a stapling station, means comprising a first electrically controlled device for conveying only one of said components at a time from said supply devices to said stapling station, a second electrically controlled device for controlling stapling of each component, following arrival at said stapling station, by its own wire leads as stapling elements, to said wafer at a position thereof which is complementary to the component being stapled, and programming means for supplying said electricity to said electrically controlled devices.

12. A machine for securing selected electrical components at selected positions of a wafer, said electrical components having wire leads, comprising a stapling head, a plurality of component supply devices each delivering a component of a different character, means comprising an electrical programming device for deriving components from selected ones of said component supply devices in predetermined sequence and delivering the selected ones of said components to said stapling head, means comprising said programming device for positioning said wafer with respect to said stapling head at positions appropriate to the selected components and means operative only following completion of delivery of a component and of positioning of said wafer for actuating said stapling head to form the wire leads of the selected component as staple elements.

(References on following page)

References Cited in the file of this patent

UNITED STATES PATENTS

| | | |
|---|---|---|
| 936,431 | Eaton | Oct. 12, 1909 |
| 1,836,113 | Garvey | Dec. 15, 1931 |
| 1,859,951 | Blevney | May 24, 1932 |
| 2,386,520 | Watson | Oct. 9, 1945 |
| 2,398,997 | Berry | Apr. 23, 1946 |
| 2,420,660 | Falter | May 20, 1947 |
| 2,446,643 | Farmer | Aug. 10, 1948 |
| 2,457,558 | Hornfeck | Dec. 28, 1948 |
| 2,475,326 | Johnson | July 5, 1949 |
| 2,575,976 | Rock | Nov. 20, 1951 |
| 2,608,745 | Barry | Sept. 2, 1952 |
| 2,631,213 | Martines | Mar. 10, 1953 |

FOREIGN PATENTS

| | | |
|---|---|---|
| 580,790 | Great Britain | Sept. 19, 1946 |

OTHER REFERENCES

"Mechanized Production of Miniature Electronic Packaged Subassemblies Using Modular Construction" Final Report, Feb. 28, 1953, Melpar Inc., Alexandria, Va.